United States Patent
Schneider et al.

(10) Patent No.: US 12,427,002 B2
(45) Date of Patent: Sep. 30, 2025

(54) DENTAL PROSTHESIS MOLDING BLOCK AND METHOD FOR PRODUCING A DENTAL PROSTHESIS PART FROM THE DENTAL PROSTHESIS MOLDING BLOCK

(71) Applicant: SIRONA DENTAL SYSTEMS GMBH, Bensheim (DE)

(72) Inventors: Sascha Schneider, Mühltal (DE); Peter Fornoff, Reichelsheim (DE)

(73) Assignee: Dentsply Sirona Inc., York, PA (US)

( * ) Notice: Subject to any disclaimer, the term of this patent is extended or adjusted under 35 U.S.C. 154(b) by 484 days.

(21) Appl. No.: 16/767,746

(22) PCT Filed: Nov. 28, 2018

(86) PCT No.: PCT/EP2018/082837
§ 371 (c)(1),
(2) Date: May 28, 2020

(87) PCT Pub. No.: WO2019/106009
PCT Pub. Date: Jun. 6, 2019

(65) Prior Publication Data
US 2021/0000573 A1    Jan. 7, 2021

(30) Foreign Application Priority Data
Nov. 28, 2017 (DE) .......................... 102017221344.2

(51) Int. Cl.
*A61C 13/00* (2006.01)
*A61C 8/00* (2006.01)
(Continued)

(52) U.S. Cl.
CPC ........ *A61C 13/0004* (2013.01); *A61C 8/0004* (2013.01); *A61C 8/0013* (2013.01);
(Continued)

(58) Field of Classification Search
CPC .................................................... A61C 13/006
See application file for complete search history.

(56) References Cited

U.S. PATENT DOCUMENTS 3,474,537 A * 10/1969 Christensen ......... A61C 8/0009
433/174
4,615,678 A * 10/1986 Moermann ........ A61C 13/0022
433/201.1
(Continued)

FOREIGN PATENT DOCUMENTS

DE        19654055 A1    6/1998
DE    102017221344 A1    5/2019
(Continued)

OTHER PUBLICATIONS

International Search Report; PCT/EP2018/082837; Jun. 21, 2019 (completed); Jul. 3, 2019 (mailed).
(Continued)

*Primary Examiner* — Jacob J Cigna
(74) *Attorney, Agent, or Firm* — SCHWEGMAN LUNDBERG & WOESSNER, P.A.

(57) ABSTRACT

The present invention relates to a dental prosthesis molding block for producing a dental prosthesis part. The block comprises an inner material that is at least partially surrounded by an outer material, the hardness of which differs from the hardness of the inner material. The inner material forms part of a first surface of the dental prosthesis molding block. The invention further relates to a method for producing a dental prosthesis part. In said method, a dental prosthesis molding block is provided, and the dental prosthesis part is produced by removing material from the dental prosthesis molding block using a CAD/CAM process. In doing so, a pin having a self-tapping external screw thread is created.

11 Claims, 5 Drawing Sheets

(51) Int. Cl.
*A61C 8/02* (2006.01)
*A61C 13/083* (2006.01)
(52) U.S. Cl.
CPC ...... *A61C 13/0022* (2013.01); *A61C 13/0835* (2013.01); *Y10T 428/12229* (2015.01)

(56) References Cited

U.S. PATENT DOCUMENTS

| | | | | |
|---|---|---|---|---|
| 6,287,119 | B1 * | 9/2001 | van Nifterick | A61C 13/0004 433/68 |
| 6,991,853 | B2 * | 1/2006 | Branco de Luca | A61C 13/0022 433/201.1 |
| 7,255,562 | B2 * | 8/2007 | Rusin | A61K 6/891 433/223 |
| D616,097 | S * | 5/2010 | Johnson | D24/156 |
| 9,610,146 | B2 * | 4/2017 | Odanaka | A61C 13/0022 |
| 9,901,427 | B2 * | 2/2018 | Brehm | A61C 8/005 |
| 10,575,931 | B2 * | 3/2020 | Matouk | A61C 8/008 |
| 2007/0128580 | A1 * | 6/2007 | Mormann | A61C 8/0051 433/201.1 |
| 2007/0264612 | A1 | 11/2007 | Mount | |
| 2008/0206711 | A1 * | 8/2008 | Morgan | A61C 13/0022 433/174 |
| 2008/0254414 | A1 * | 10/2008 | McGuire | A61C 13/0022 433/172 |
| 2012/0251979 | A1 | 10/2012 | Karim et al. | |
| 2015/0024345 | A1 | 1/2015 | Eftekhar Ashtiani | |
| 2015/0216635 | A1 | 8/2015 | Schweiger | |
| 2015/0251979 | A1 | 9/2015 | Verhaak | |
| 2018/0140393 | A1 * | 5/2018 | Matouk | A61C 8/008 |
| 2022/0296344 | A1 * | 9/2022 | Lee | G06N 3/02 |

FOREIGN PATENT DOCUMENTS

| | | |
|---|---|---|
| EP | 0160797 A1 | 11/1985 |
| KR | 20130097820 A | 9/2013 |
| WO | 2008009272 A1 | 1/2008 |
| WO | WO-2011034780 A1 * | 3/2011 ......... A61C 13/0004 |
| WO | WO-2019106009 A2 | 6/2019 |
| WO | WO-2019106009 A3 | 8/2019 |

OTHER PUBLICATIONS

International Preliminary Report on Patentability; PCT/EP2018/082837; Jun. 21, 2019 (completed); Jul. 3, 2019 (mailed).

Written Opinion of the International Searching Authority; PCT/EP2018/082837; Jun. 21, 2019 (completed); Jul. 3, 2019 (mailed).

Chinese Office Action dated Jan. 6, 2022.

* cited by examiner

DENTAL PROSTHESIS MOLDING BLOCK AND METHOD FOR PRODUCING A DENTAL PROSTHESIS PART FROM THE DENTAL PROSTHESIS MOLDING BLOCK

TECHNICAL FIELD

The present invention relates to a dental prosthesis molding block. The invention also relates to a method for producing a dental prosthesis part, in particular from the dental prosthesis molding block. Furthermore, the present invention relates to a computer program, which executes all steps of the method when run on a computer, as well as a data carrier that stores said computer program. Lastly, the invention relates to a dental CAD/CAM system, which is configured to carry out the method.

BACKGROUND OF THE INVENTION

One-piece dental implants, in which the abutment part is firmly connected to the implant, have to date been pre-produced in standard shapes. These standard implants can be made of ceramic or titanium, for example, and can be linear or even angled. Customization of the one-piece standard implants is difficult, however, because the pre-produced parts have to be held and processed extraorally, taking into account a later screw-in rotation and screw-in height. It is very difficult to customize standard implants only after they have been inserted and healed into the jaw, because the energy to be introduced could heat or loosen the parts.

Implants that consist of multiple parts are therefore an alternative to the standard implants. In this case, an implant screw is a separate standard part that can be screwed into a customizable abutment structure. This can then easily be processed extraorally. However, in a multipart implant, gaps can form between the individual elements. These allow bacteria to migrate into the interior of the implant and from there, through mechanical effects of chewing, they can migrate out intermittently over time and infect the bone. This leads to peri-implantitis, which manifests itself in bone recession and a subsequent loss of the implant. Furthermore, in multipart implants, mechanical wear can occur at the connection between the elements. After several million chewing cycles, the screw, and with it also the abutment, loosens or the screw even breaks.

Automated CAD/CAM processes, in which the respective dental prosthesis part is carved out of a dental prosthesis molding block, are increasingly being used to produce the abutments of multipart implants. This makes it possible for manufacturers to provide a consistently high level of quality and accuracy of fit of the dental prosthesis while at the same time ensuring reasonable prices.

A dental prosthesis molding block, having a channel for a screw which passes through the block from one side surface to the opposite side surface and in one side surface of which a connecting part for an abutment is attached, is known from US 2012/0251979. The connecting part can be made of metal, ceramic or a polymer.

A molded body for producing dental prosthesis parts, which consists of a base body and a surrounding layer, is known from DE 196 54 055 A1. To clamp the molded body in a milling machine, one surface comprises a bore into which a holding pin can be inserted.

WO 2008/009272 A1 describes processing a green body into a molded body, which comprises an anchoring section having a thread and an abutment section for attaching prosthetic elements. It is an object of the present invention to provide a dental prosthesis molding block, from which a dental prosthesis part can be produced by means of a CAD/CAM process that does not have the abovementioned disadvantages of multipart implants. A further object of the invention is to provide a method for producing such a dental prosthesis part.

A further object of the invention is to provide a method for producing such a dental prosthesis part.

SUMMARY OF THE INVENTION

This object is achieved by a dental prosthesis molding block for producing a dental prosthesis part, in particular an implant, which comprises an inner material that is at least partially surrounded by an outer material. The hardness of the inner material differs from the hardness of the outer material. Hardness is in particular understood to be the Vickers hardness according to the standard DIN EN ISO 6507-1:2005 to -4:2005. The inner material can thus be used as a starting material for producing a pin having a self-tapping external screw thread, and the outer material can serve as a starting material for an abutment.

The inner material forms a portion of a first surface of the dental prosthesis molding block. The pin can thus be carved out of the first surface by removing material. It is therefore possible to produce a one-piece dental prosthesis part in the form of an implant extraorally using a CAD/CAM method. This combines the advantage of the one-piece design of standard implants, that no loosening of individual components can take place and that no gaps can form in the implant, which can be colonized by bacteria, with the advantage of multipart implants, that extraoral production of the abutment is possible. This production does not have to take place in a dental laboratory, but can also be carried out in a dental office.

The inner material can be completely surrounded by the outer material on the first surface. All other surfaces of the dental prosthesis molding block can be composed of the outer material. The pin thus protrudes from the first surface after the material is removed, and is otherwise completely surrounded by the outer material.

In a preferred embodiment, the inner material has a lower hardness than the outer material. The inner material is particularly preferably a metal, such as in particular titanium (Vickers hardness approx. 200 HV 10). In this embodiment, the outer material is particularly preferably a ceramic, such as in particular zirconium dioxide ($ZrO_2$, Vickers hardness approx. 1250 HV 10) or a lithium disilicate (Vickers hardness approx. 650 HV 10) or glass ceramic. On the one hand, this allows a secure anchoring of the dental prosthesis part in the jaw by means of the metal pin formed from the inner material and, on the other hand, an aesthetically pleasing design of the ceramic abutment. Since the metal as the inner material is at least partially surrounded by an outer material in the finished implant as well, the abutment is provided with a special stability. In addition, the pin is formed in one piece with the inner material, which remains in the ceramic.

In another particularly preferred embodiment, the inner material and the outer material are metals. In this case, the metal of the outer material is harder than the metal of the inner material. Titanium (Vickers hardness approx. 200 HV 10) is advantageous as the inner material because of its good biocompatibility and incorporation properties, while a cobalt-chromium alloy (CoCr, Vickers hardness approx. 300 HV 10) is advantageous as the outer material because of its cost-effectiveness.

In yet another embodiment, the inner material has a greater hardness than the outer material. Zirconium dioxide ($ZrO_2$, Vickers hardness approx. 1250 HV 10) is advantageous as the inner material because of its biocompatibility and aesthetics, while a cobalt-chromium alloy (CoCr, Vickers hardness approx. 300 HV 10) is advantageous as the outer material because of its cost-effectiveness, or a lithium disilicate (Vickers hardness approx. 650 HV 10) or glass ceramic is advantageous as the outer material because of its aesthetics and workability.

The dental prosthesis molding block comprises an internal screw thread, which extends into the inner material from a second surface. The second surface is opposite to the first surface. This allows further elements to be screwed onto the one-piece implant once it has been produced.

The object is further achieved by the method for producing a dental prosthesis part. First, a dental prosthesis molding block according to the invention is provided. The dental prosthesis part is produced by removing material from the dental prosthesis molding block according to the invention. This production is carried out using a CAD/CAM process. A pin having a self-tapping external screw thread is formed from a portion of the inner material. The method thus makes it possible to use known CAD/CAM techniques to produce a one-piece dental prosthesis part, in particular an implant, from the dental prosthesis molding block.

Since the dental prosthesis molding block comprises an internal screw thread that extends from the second surface into the inner material, the dental prosthesis part is produced in such a way that a dental prosthesis supply element can be screwed into the internal screw thread of the dental prosthesis part. The dental prosthesis supply element can be an abutment, for example. In this embodiment, the one-piece dental prosthesis part forms a base for the abutment.

Unlike when processing one-piece standard implants, which have to be clamped by their pin, the dental prosthesis molding block can be secured in a CAD/CAM process via one of its surfaces. The pin is then preferably formed first in a first region of the dental prosthesis molding block by completely removing the outer material and partially removing the inner material. Then the outer material is partially removed in a second region of the dental prosthesis molding block, so that there is no surface of the dental prosthesis molding block in the second region on which the inner material is exposed.

The dental prosthesis part is preferably produced on the basis of data from a patient acquired with an intraoral camera, so that it can be customized to the requirements of said patient.

BRIEF DESCRIPTION OF THE DRAWINGS

Design examples of the invention are shown in drawings and are explained in more detail in the following description.

DETAILED DESCRIPTION OF THE INVENTION

Figure 1:
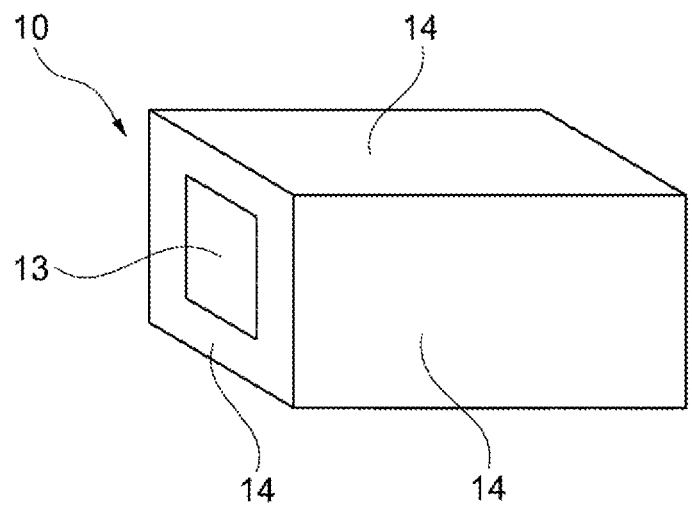
FIG. 1 shows an isometric illustration of a dental prosthesis molding block.
Figure 2:
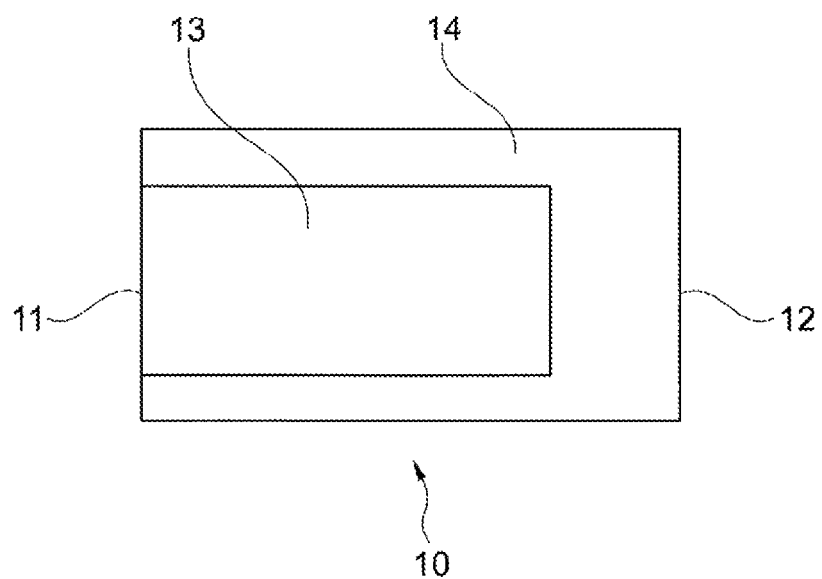
FIG. 2 shows a cross-sectional view of the dental prosthesis molding block according to FIG. 1.

A cuboid dental prosthesis molding block 10 having a first surface 11 and an opposite second surface 12 is shown in FIGS. 1 and 2. A core of the dental prosthesis molding block 10 includes titanium as an inner material 13. Zirconium dioxide is pressed onto this as an outer material 14. The first surface 11 thus consists partly of titanium and partly of zirconium dioxide, while all the other surfaces of the dental prosthesis molding block 10 consist exclusively of zirconium dioxide. The inner material 13 is exposed on the surface 11 and is surrounded in a frame-like manner by the outer material 14. All other surfaces of the dental prosthesis molding block 10 are formed by the outer material.

The core of the dental prosthesis molding block 10 may include titanium as an inner material 13 and the outer material 14 may be a cobalt-chromium alloy or a glass ceramic.

The core of the dental prosthesis molding block 10 may also include zirconium dioxide as an inner material 13. The outer material 14 may be titanium, for example, a cobalt-chromium alloy or a glass ceramic.

Figure 3:
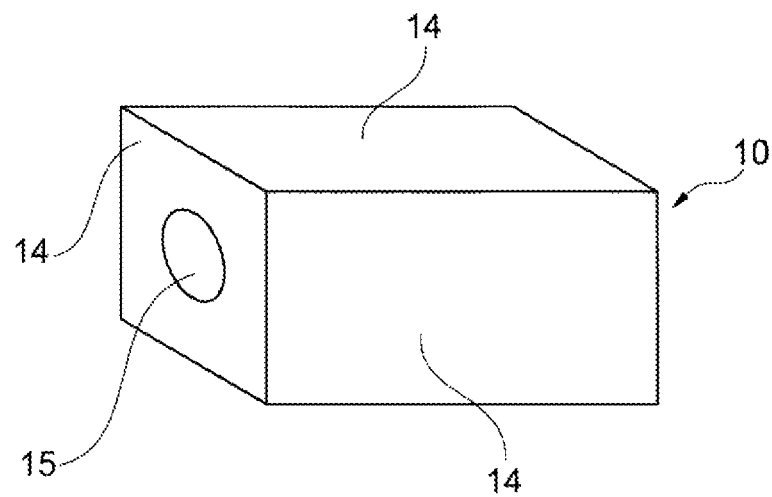
FIG. 3 shows an isometric illustration of a dental prosthesis molding block according to a design example of the invention.
Figure 4:
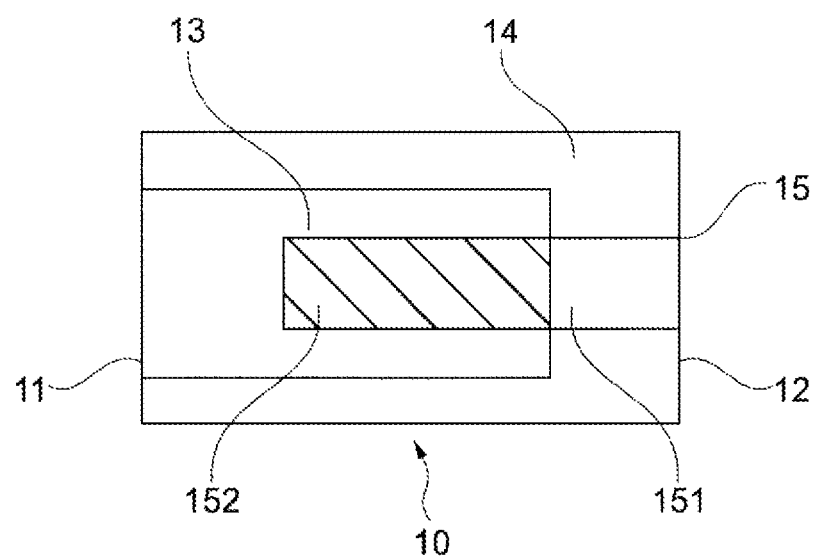
FIG. 4 shows a cross-sectional view of the dental prosthesis molding block according to FIG. 3, which has been rotated 180° in the plane of the drawing.

In one design example of the dental prosthesis molding block 10 according to the invention, which is shown in FIGS. 3 and 4, said molding block consists of the same materials as described above. Starting from the second surface 12, an opening 15 extends through the outer material 14 into the inner material 13. Whereas the region 151 in the outer material 14 has smooth inner walls, the region 152 in the inner material 13 is provided with an internal screw thread 153.

Figure 5:
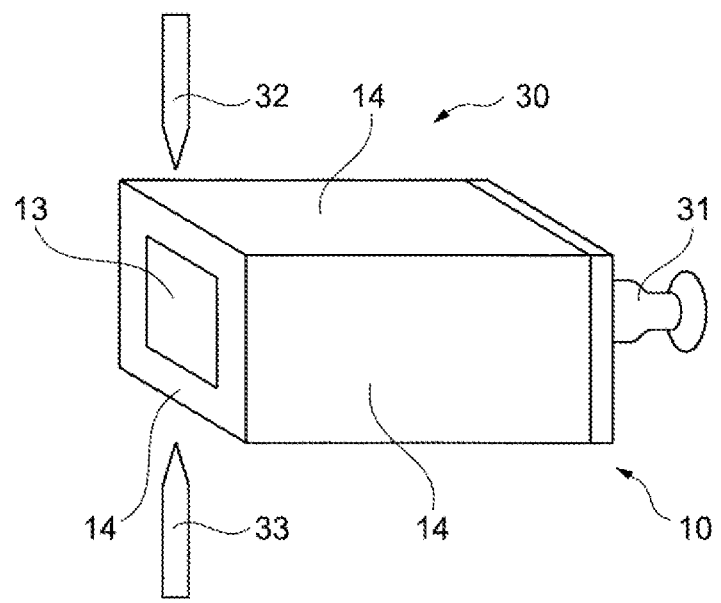
FIG. 5 shows a first processing step of a dental prosthesis molding block in a method according to a design example of the invention.

In a first design example of the method according to the invention, a desired form of a dental prosthesis part is defined in a dental CAD/CAM system 30 on the basis of data from a patient. This data can be obtained with the aid of an intraoral camera, for example. A dental prosthesis molding block 10 is then inserted into the CAD/CAM system 30 according to the design example according to the invention described above, and secured there on its second surface 12 by means of a block holder 31. This is shown in FIG. 5. Material removal tools 32, 33 are positioned above and below the dental prosthesis molding block 10.

Figure 6:
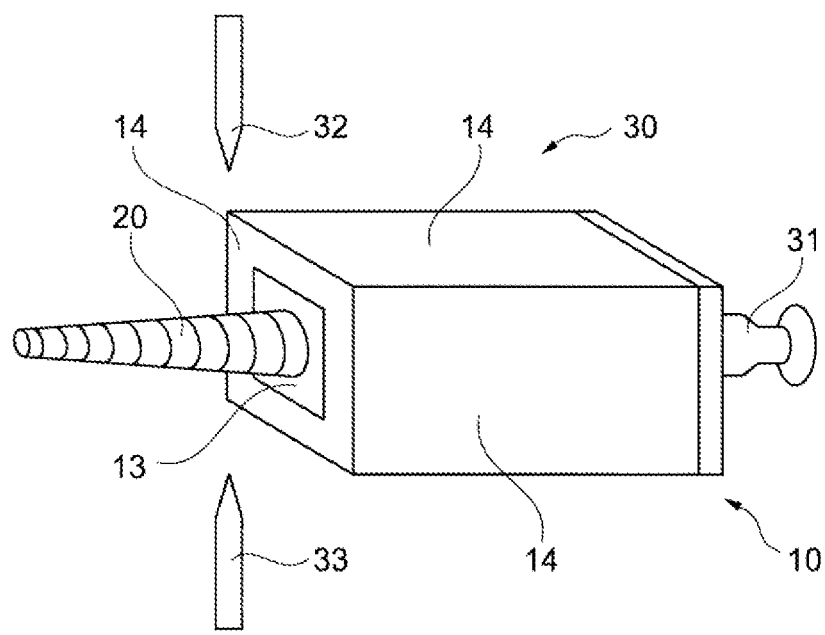
FIG. 6 shows a second processing step of a dental prosthesis molding block in a method according to a design example of the invention.
Figure 7:
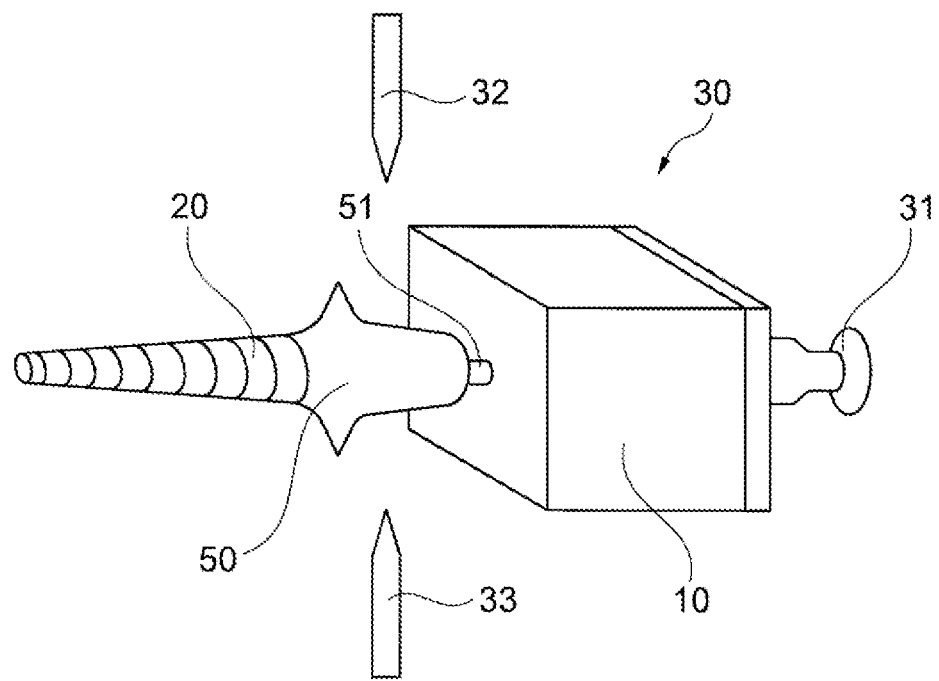
FIG. 7 shows a third processing step of a dental prosthesis molding block in a method according to a design example of the invention.

The material removal tools 32, 33 are used to remove material from the dental prosthesis molding block 10, starting at the first surface 11, to first form a pin 20 having a self-tapping external screw thread. This is shown in FIG. 6. The outer material 14 is completely removed in a first region of the dental prosthesis molding block 10. The inner material 13 is partially removed in this region to form the pin 20. Then, as shown in FIG. 7, a dental prosthesis part 50 is formed, which at the end of the material removal is connected to the dental prosthesis molding block 10 only by a cut-out piece 51. To do this, the outer material 14 is partially removed in a second region of the dental prosthesis molding block 10 without exposing the inner material 13 in said second region. After removal of the cut-out piece 51, the finished dental prosthesis part 50, which is formed in one piece with the pin 20, can be removed from the CAD/CAM system 30.

Figure 8:
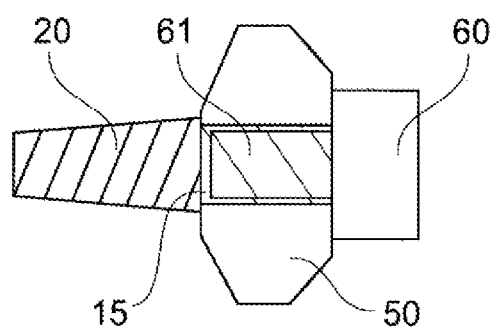
FIG. 8 shows a cross-sectional view of a dental prosthesis part which can be produced using a design example of the method according to the invention.
Figure 9:
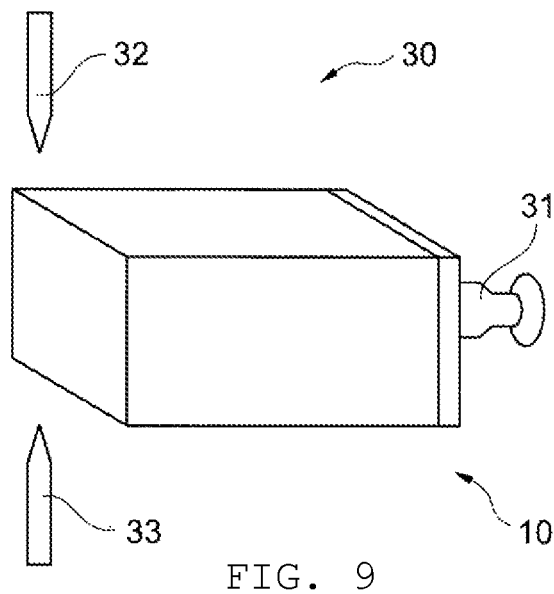
FIG. 9 shows a first processing step of a dental prosthesis molding block in a method according to another design example of the invention.
Figure 10:
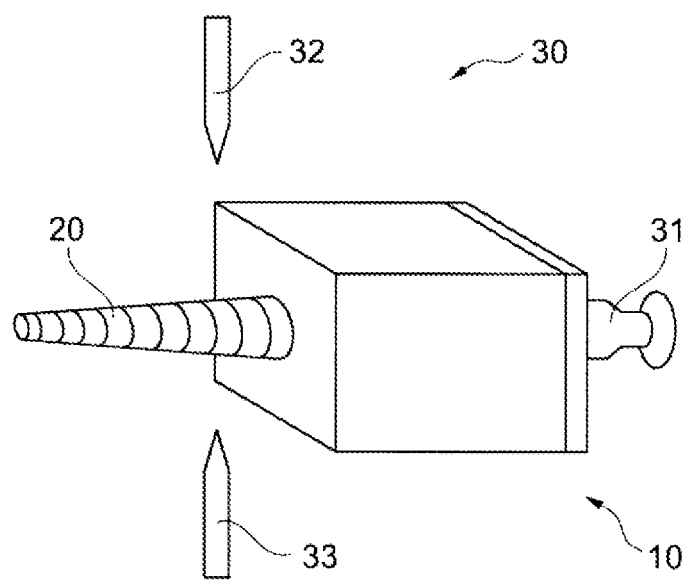
FIG. 10 shows a second processing step of the dental prosthesis molding block in a method according to another design example of the invention.

Since the dental prosthesis part 50 was produced from a dental prosthesis molding block 10 according to the invention (FIG. 4), it still has the internal screw thread 153 between the pin 20 and a surface created in the course of the material removal, which is opposite to the pin 20. The region 151 of the opening 15, which has no internal screw thread, was completely removed in the process. A dental prosthesis supply element 60 in the form of an abutment can be screwed into the internal screw thread by means of a screw 61, as shown in FIG. 8.

The examples of the dental prosthesis molding block and the method described above make the one-piece, customized production of dental prosthesis parts in the form of implants possible.

The invention claimed is:

1. Dental prosthesis molding block for producing a dental prosthesis part, comprising:
    an opening;
    an inner material with a second region of the opening disposed within the inner material; and
    an outer material with a first region of the opening disposed within the outer material;
    wherein the inner material comprises an extension into the outer material such that the extension and the second region are at least physically and partially surrounded by the outer material and an end surface of the inner material proximal to a second surface of the dental prosthesis molding block is embedded in the outer material,
    wherein the hardness of the outer material differs from the hardness of the inner material,
    wherein the inner material forms a part of a first surface of the dental prosthesis molding block that also includes the outer material, the first surface being opposite to the second surface,
    wherein the opening comprises an internal screw thread disposed in the inner material, the opening extending from the second surface, through the outer material and into the inner material,
    wherein the second surface does not include the inner material,
    wherein the first region of the opening comprises smooth inner walls,
    wherein the second region of the opening comprises the internal screw thread, and
    wherein the dental prosthesis part is an implant.

2. Dental prosthesis molding block according to claim 1, further comprising:
    a pin with a self-tapping external thread is arranged on the first surface of the dental prosthesis molding block;
    wherein the pin is integrally formed with the inner material.

3. Dental prosthesis molding block according to claim 1, wherein the inner material has a greater hardness than the outer material.

4. Dental prosthesis molding block according to claim 3, wherein the inner material is a ceramic.

5. Dental prosthesis molding block according to claim 1, wherein the inner material has a lower hardness than the outer material.

6. Dental prosthesis molding block according to claim 5, wherein the inner material is a metal and the outer material is a ceramic.

7. Dental prosthesis molding block according to claim 5, wherein the inner material and the outer material are metals.

8. Method for producing a dental prosthesis part comprising the steps of:
    providing a dental prosthesis molding block according to claim 1, and
    producing the dental prosthesis part by removing material from the dental prosthesis molding block using a CAD/CAM process, whereby a pin having a self-tapping external screw thread and a cut-out piece is created, wherein the pin is formed from a portion of the inner material, and the cut-out piece connects the dental prosthesis part to the dental prosthesis molding block.

9. Method according to claim 8, wherein the pin is first formed in a first region of the dental prosthesis molding block by completely removing the outer material and partially removing the inner material, and then the outer material is partially removed in a second region of the dental prosthesis molding block, so that there is no surface of the dental prosthesis molding block in the second region on which the inner material is exposed.

10. Method according to claim 8, wherein the dental prosthesis molding block includes an opening having the internal screw thread, the opening extending from the second surface through the outer material into the inner material and the dental prosthesis part is produced in such a way that a dental prosthesis supply element is screwable into the internal screw thread of the dental prosthesis part.

11. Method according to claim 8, wherein the dental prosthesis part is produced on the basis of data from a patient acquired by an intraoral camera.

* * * * *